United States Patent [19]

Dean, Jr.

[11] Patent Number: 5,080,325
[45] Date of Patent: Jan. 14, 1992

[54] CORROSION RESISTANT STAINLESS STEEL VALVE OR FITTING

[75] Inventor: Sheldon W. Dean, Jr., Allentown, Pa.

[73] Assignee: Air Products and Chemicals, Inc., Allentown, Pa.

[21] Appl. No.: 613,350

[22] Filed: Nov. 14, 1990

[51] Int. Cl.⁵ .............................................. F16K 3/00
[52] U.S. Cl. .................................................. 251/368
[58] Field of Search ....................... 251/368, 366, 367; 137/375

[56] References Cited

U.S. PATENT DOCUMENTS

| | | | |
|---|---|---|---|
| 2,050,339 | 8/1936 | Kidd | 251/367 |
| 2,458,502 | 1/1949 | Cape | 251/368 |
| 2,890,017 | 6/1959 | Shafer | 251/367 |
| 4,260,134 | 4/1981 | Ripert | 251/367 |
| 4,424,953 | 1/1984 | Takagi et al. | 251/368 |
| 4,513,947 | 4/1985 | Amend | 251/368 |
| 4,723,518 | 2/1988 | Kawasaki et al. | 251/368 |
| 4,754,950 | 7/1988 | Tada et al. | 251/368 |

FOREIGN PATENT DOCUMENTS 380951 8/1940 Italy ..................... 251/367

*Primary Examiner*—A. Michael Chambers
*Attorney, Agent, or Firm*—James C. Simmons; William F. Marsh

[57] ABSTRACT

Corrosion resistance of valves or fittings exposed to corrosive attack by the environment in which they are normally used can be improved by covering those portions of the valve or fitting of thinner cross-section by a thin metal sleeve fabricated from an alloy resistant to corrosive attack by the environment.

7 Claims, 4 Drawing Sheets

5,080,325

CORROSION RESISTANT STAINLESS STEEL VALVE OR FITTING

FIELD OF THE INVENTION

This invention relates to an improvement in valves or fittings exposed to corrosive attack by the environment in which the valve operates.

More particularly it relates to the protection of stainless steel valves from attack by HCl and similar chemicals to which they may be exposed in service.

BACKGROUND OF THE INVENTION

Stainless steels are alloys of iron with chromium, nickel and other expensive metals and are known to be resistant to attack by many types of corrosive influences and it is possible to cast or forge valve bodies of sufficient thickness that they can resist such attack for long periods of time, but this adds to the cost of the valve and the increase in weight is often unacceptable for the intended use.

Futhermore many stainless steel alloys are formulated with constituents such as sulfur added to make them readily fabricable, e.g. by machining, and many such alloys are known to be subject to pitting corrosion when exposed to specific environments such as those containing HCl, HF, $H_2S$ and other acidic gases.

One proposed means for increasing the service life of metal valves has been to provide a lining of corrosion resistant material for those surfaces exposed to the corrosive medium. Such linings are known in U.S. Pat. No. to Newton U.S. Pat. No. 2,352,799; Vogler U.S. Pat. No. 3,120,247; Fitting U.S. Pat. No. 3,568,709; Becker U.S. Pat. No. 4,356,612 and Kawai U.S. Pat. No. 4,601,087 and others of a similar nature. The constructions shown in these patents offer little or no protection against corrodents which leak from the fittings adjacent the valve body and which then enter the atmosphere around the valve, and some of which may ultimately condense on the exterior surfaces of the valve which is formed of an alloy susceptible to corrosive attack by the condensate.

Other previously suggested means for protecting alloy steel valve bodies from corrosive attack include constructing a housing or enclosure around the valve body as shown in Rentschler U.S. Pat. No. 3,367,360 issued Feb. 6, 1968; casting a composite as shown in Waltien U.S. Pat. No. 3,446,236 issued May 27, 1969; or encapsulating the valve in a sheath of elastic distendable synthetic resin as shown in David U.S. Pat. No. 3,738,383 issued June 12, 1973 and Peroux U.S. Pat. No. 4,510,965 issued Apr. 16, 1985. Such proposals require expensive apparatus to carry out the procedures described and have not been widely adopted in the field.

BRIEF SUMMARY OF THE INVENTION

At least those portions of a valve having a thinner cross-section than the valve body (e.g., stubs, nipples,, conduits, fitings) have that portion of their outer surface from the valve's body outwardly covered by a thin metal sleeve fabricated from an alloy which exhibits greater resistance to corrosive attack by the environment to which said valve is exposed than the resistance to corrosive attack by said environment exhibited by an unprotected stub it is exposed thereto.

One advantage of this invention is to provide a simpler construction which will extend the service life of valves and fittings used in corrosive environments of the type previously noted.

The invention provides a method of protecting corrosion susceptible valves from attack by the corrosive constituents in the environment to which they are exposed.

Another advantage of this invention is to permit the use of conventional stainless steel valves and fittings in aggressive service while not requiring slower welding speeds and bulkier designs necessary for thicker units. It also avoids to need to lower sulfur content in the valve body alloy thereby facilitating easier machining, finishing and welding.

The invention also provides a method of fabricating valves with longer service life which does not require retooling to manufacturer higher cost alloy valves and fittings and which gives better protection than the conventional approach described above.

DETAILED DESCRIPTION OF THE INVENTION

This invention consists of providing metallic sleeves that cover the areas most susceptible to pitting penetration on machined items used in corrosive gas service where the primary threat of failure is at thin wall tubular portions containing cross grain structures where the forming direction of the original shape is perpendicular to the axis of the tube. The metallic sleeve is formed either by drawing or cupping and is of a size which fits snugly over the thin wall tubular portions of the fitting.

Figure 1:
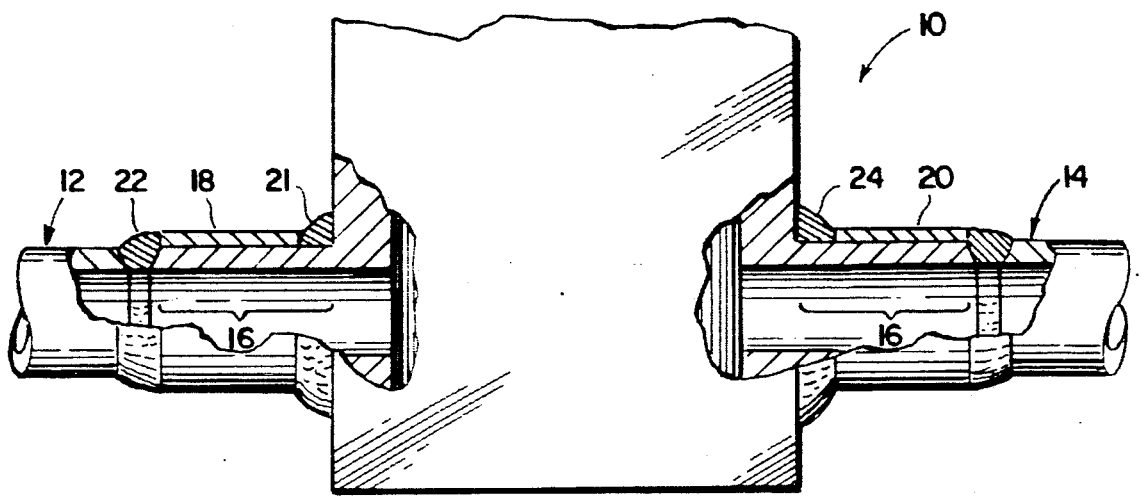
FIG. 1 is a view, partly in section of a valve body constructed in accordance with the present invention.

FIG. 1 shows a portion of a valve body 10 having an inlet stub, (conduit, nozzle, fitting) 12 and an outlet stub 14 which are often formed in the body by forging or other metal working operation such that the grain in the relatively thinner regions 16 is particularly susceptible to intergranular attack by corrosive acidic gases in the environment surrounding valve body 10 in service. In order to protect the vulnerable regions of stubs 12 and 14 from such attack the present invention provides sleeves 18, 20 which are welded to valve body 10 at welds 21 and are welded to stubs 12 and 14 at welds 22 and 24.

FIG. 1 shows a cross section of inlet stub 12 on a machined valve body 10 with the protective sleeve 18 in place. The valve body 10 is a stainless steel alloy such as type 316L. The material of the sleeve 18 should have substantial resistance to the corrosive gas expected to be encountered in service. In the case of hydrogen halides such as hydrogen chloride, or the ionizable halide gases such as chlorine, an alloy such as UNS N06022 has excellent reistance and would be preferred for this service. Other suitable alloys include but are not limited to: UNS number alloys:

N06030 (Hastelloy G-30)
N16110 (Allcorr)
N06455 (Hastelloy C-4)
N06625 (Inconel 625)
N10001 (Hastelloy B)
N10665 (Hastelloy B-2)
N06007 (Hastelloy G)
N10276 (Hastelloy C276)

These alloys are characterized by molybdenum contents exceeding 7% and nickel contents in excess of 30%. In most cases alloys with a chromium content in excess of 20% and a molybdenum content in excess of 10% are preferred.

These alloys have outstanding resistance to aqueous hydrochloric acid in the presence of air or oxidizing agents such as ferric ions or cupric ions. They must not be subject to pitting or cracking forms of corrosion in such environments, nor should their general corrosion rate exceed 5 mpy. In addition, they should be readily weldable to stainless steel using the TIG (Tungsten Insert Gas) arc welding process, especially in an orbital process without filler metal (autogenous). The resulting weld must have better corrosion resistance than the stainless steel and should not be subject to decay, pitting or other localized failure.

The sleeves 18, 20 should be fabricated to be relatively thin, e.g., preferably 0.005" to 0.010" in thickness but 0.001" to 0.030" constitute an acceptable range to accomplish protection and availability without excess cost or welding difficulty.

Valves made of type 316L stainless steel with and without protective sleeves have been tested in accordance with the procedure described in ASTM Standard Designation G48-76 (Reapproved 1980) entitled "Standard Test Methods for Pitting and Crevice Corrosion Resistance of Stainless Steel and Related Alloys by the Use of Ferric Chloride Solution" which is an excellent method for accelerating pitting caused by manganese sulfide stringers. The test procedure spelled out in this standard has been followed to demonstrate the pitting tendency of components. Gas valve bodies fabricated by Nupro Company of Willoughby, Ohio from type 316L stainless steel which are typical of the type used in hydrogen chloride service were used for the tests. A Hastelloy Alloy C22 sleeve was welded on one of the tubulation stubs on the Nupro valve so that it completely covered the stub. It was seal welded to the valve body and a type 316L stainless steel tube. The assembly was then tested according to ASTM G48-76, for 3 days at room temperature.

The problem of stainless steel in hydrogen chloride service is that small releases of hydrogen chloride, for example from tiny leaks around fittings and valve packing or from improper procedure during changing of cylinders, cause the formation of a hydrochloric acid condensate. This condensate forms on metal surfaces, especially if they are cooler than the environment. This condensate is corrosive to stainless steel and forms a mixed chloride solution on the stainless surface. The reaction of the ferrou chloride in this solution with oxygen from the air causes ferric chloride to form in situ. Ferric chloride is a potent pitting agent for stainless steels and consequently pits will tend to form wherever there are crevices, inclusions or stringers. Manganese is commonly added to stainless steels to control the sulfur in these alloys, and it form manganese sulfide particles in the steel when the alloy is cast. Subsequent forming operations such as hot rolling, cold rolling or forging tend to elongate these particles into stringers that are aligned in the forming direction. Maganese sulfide is recognized as a specific agent for initiating and directing pit growth. The interaction of ferric chloride and manganese sulfide is a well known combination for producing pits in stainless steels.

Ferric chloride and cyclic hydrochloric acid exposure tests were performed on a Nupro gas valve body having one stub protected by a Hastelloy C-22 sleeve welded over the stub. The C-22 sleeve was very effective in preventing the type of end grain attack which as resulted in failures of valves used in gas cabinets supplied by Air Products and Chemicals, Inc. of Allentown, Pennsylvania.

Figure 2:
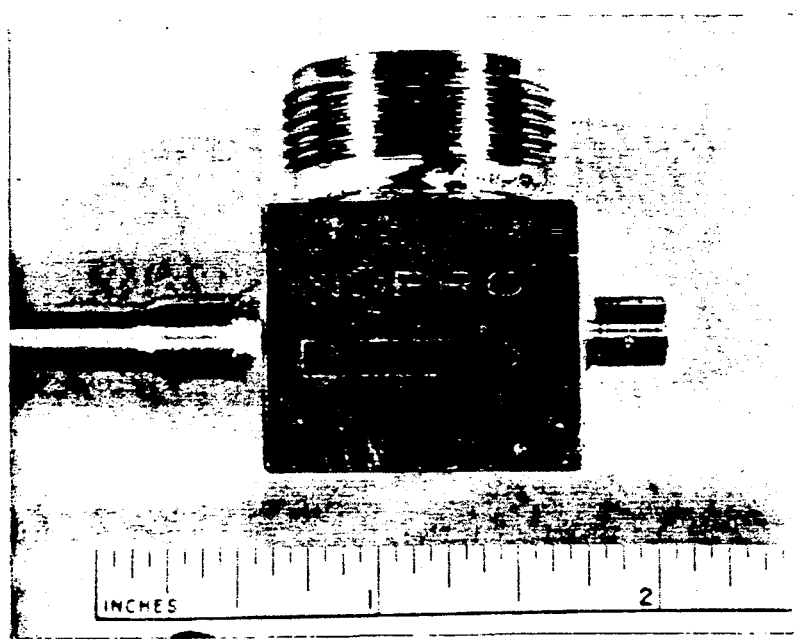
FIG. 2 is a slightly enlarged photograph of a valve body modified according to the invention after testing in $FeCL_3$ showing significant end grain attack on the valve body.
Figure 3:
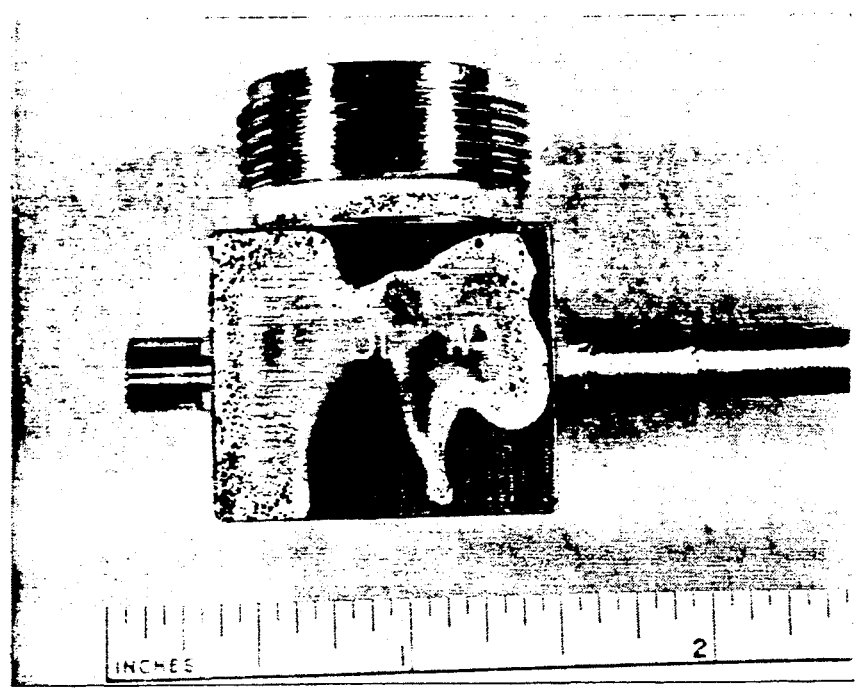
FIG. 3 is a slightly enlarged photograph of a valve modified according to the invention after testing in $FeCl_3$ showing significant end grain attack on the valve body.
Figure 4:
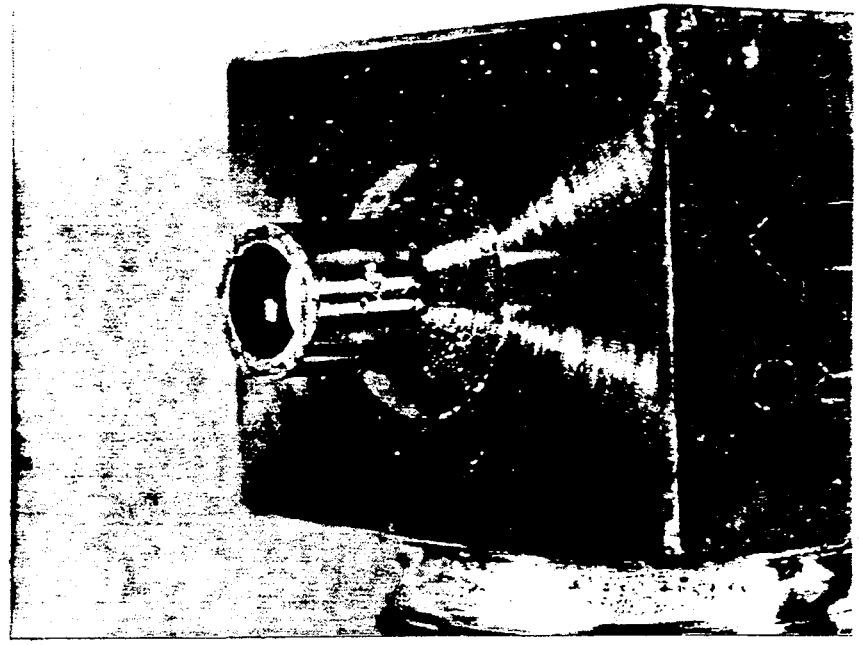
FIG. 4 is an enlarged photograph of the valve body of FIG. 2 showing severe pitting and several perforations of the wall of the unprotected valve stub.
Figure 5:
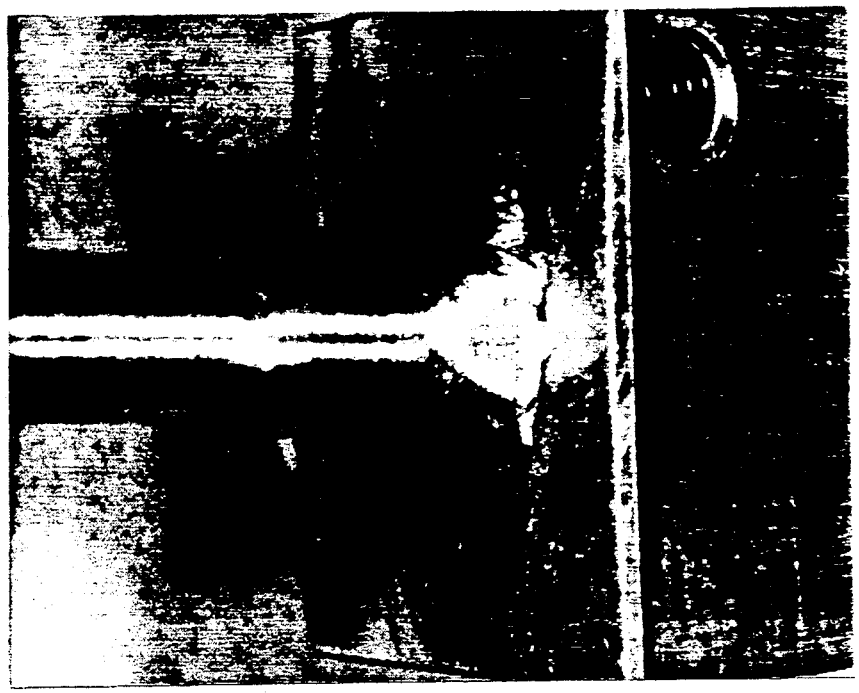
FIG. 5 is an enlarged photograph of the valve body of FIG. 2 showing no corrosion of the stub of the valve body protected according to the invention.

FIGS. 2 and 3 are photographs of one of the modified valves modified according to the present invention after 3 days exposure to 6% $FeCl_3$. Deep pitting and crevice attack typical for the 316L valve bodies in this very aggressive environment are clearly visible. The creviced area of FIG. 3 resulted from the surface shown resting on the bottom of the test vessel. Pitting is also apparent on the unprotected valve stub as shown in the photograph of FIG. 4. No corrosion is visible on the valve stub protected by the C-22 sleeve as shown in the photograph of FIG. 5. Perforations are visible on the unprotected stub (FIG. 4), while only one mild pitted area associated with a weld edge is visible on the protected stub (FIG. 5). Until the first perforation occurred on the unprotected stub, the test solution was excluded from the valve interior. Therefore, at least one of the perforations was caused solely by outside-in attack.

Figure 6:
FIG. 6 is a photomicrograph at 50 magnifications showing pitting corrosion of an unprotected valve stem after severe damage in a cyclic HCl exposure test.
Figure 7:
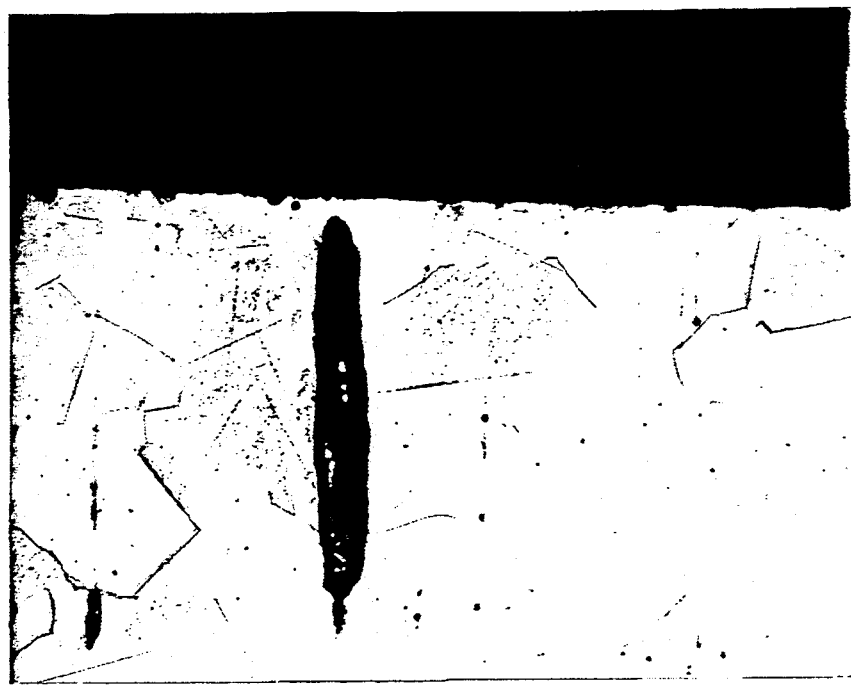
FIG. 7 is a photomicrograph at 200 magnification of the large pit shown via the center of FIG. 6.

Similar valves which have been exposed to a cyclic condensing HCl/water vapor test for 5 to 7 days showed only slight staining. Past experience with this test indicates that significant corrosion can take place along MnS inclusion boundaries. This corrosion is not visible at low magnifications and is best viewed by sectioning the exposed parts along the axis of the sulfide inclusions. Cross sections of a valve from one of these tests are shown in FIGS. 6 and 7.

A further test of the valve body of this invention was also performed. Essentially this test duplicates what occurs in service. The Nupro valve body was cooled to promote condensation. It was then exposed to the vapors of a 20% hydrogen chloride solution. Initially the condensate will be dilute hydrochloridic acid but as the valve body warms up the condensate becomes more concentrated in hydrogen chloride until it reaches 20%. The specimen was removed from the source of hydrochloric acid vapors so that the acid could evaporate and the corrosion products could oxidize to form ferric chloride in situ. A one hour oven exposure accelerated the drying and localization of corrosion process.

This test has been very successful in duplicating the type of pitting observed on 316L stainless steel that has been in hydrogen chloride service. As shown in FIGS. 6 and 7 the pitting generally follows manganese sulfide inclusions and penetrated about one-third of the wall thickness. In the present test deep pits that completely penetrated the wall thickness were not observed by the metallographic section method but were noted in a pressurized leak test.

Figure 8:
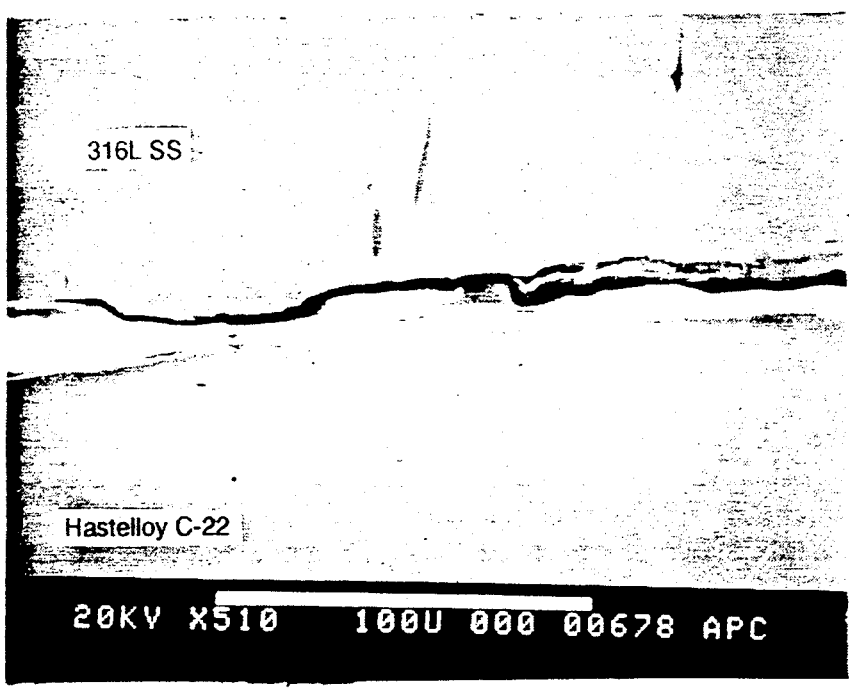
FIG. 8 is a photomicrograph at 510 magnification of a protected valve stub after 7 days in a cyclic HCl exposure test.

On one stub on this valve body a Hastelloy c22 sleeve was used to protect the vulnerable area. There was no attack or damage to this area even though it was exposed to the same environment as shown by the photomicrograph of FIG. 8.

The invention may be used on unlined valve bodies as shown or on valves which have been lined with a corrosion protective lining.

Having thus described my invention, what is desired to be protected by Letters Patent of the United States is set forth in the appended claims.

I claim:

1. A corrosion resistant valve or fitting comprising;
  a valve body having at least one integral tubular stub extending from said body, said body formed of an alloy which is non-corrosive to substance passing through the valve body and susceptible to corrosion in an environment produced by said substance leaking from said valve and reacting with the ambient atmosphere; and
  a thin metal sleeve disposed around said stub said sleeve extending from said valve body along the entire length of the surface of said stub, said sleeve fixed to aid body and said stub by circumferential welds, said sleeve being composed of an alloy which exhibits a greater resistance to corrosive attack by the environment to which said valve or fitting is exposed than the resistance to corrosive attack by said environment exhibited by said stub and is readily weldable to said body.

2. The value or fitting of claim 1 wherein the valve body is composed of a stainless steel alloy.

3. The valve or fitting of claim 1 wherein the stub is composed of an alloy with at least 20% Cr, at least 30% Ni and at least 7% Mo.

4. The valve of claim 1 wherein said sleeve has a thickness between 0.001" and 0.030".

5. A method of improving the corrosion resistance of valve or fitting having a valve body with at least one tubular stub extending from said valve body, said valve body formed of an alloy which is susceptible to corrosion in the environment produced by small amounts of the substance passing through said valve leaking into the ambient atmosphere to which it is exposed comprising the steps of:
  surrounding each tubular stub extending from said valve body with a thin metal sleeve extending from said valve body along the entire length of said stub, said sleeve being composed of an alloy which exhibits a greater resistance to corrosive attack by the environment to which said valve or fitting is exposed than the resistance to corrosive attack by said environment exhibited by said stub and which is readily weldable to said body, and;
  circumferentially welding one end of said sleeve to said body and the other end of said sleeve to said stub.

6. The method of claim 5 including fabricating the valve body from a stainless steel alloy.

7. The method of claim 5 wherein said welding is done by the tungsten inert gas welding process.

* * * * *